(12) United States Patent
de Koning

(10) Patent No.: US 11,750,240 B2
(45) Date of Patent: Sep. 5, 2023

(54) METHOD USING ULTRA WIDE BAND (UWB) AND UWB SYSTEM FOR DETERMINING A LOCATION OF AN OBJECT INSIDE A PLANT GROWING ENVIRONMENT

(71) Applicant: Ridder Holding Harderwijk B.V., Harderwijk (NL)

(72) Inventor: Adrianus Noël Maria de Koning, Maasdijk (NL)

(73) Assignee: Ridder Holding Harderwijk B.V., Harderwijk (NL)

( * ) Notice: Subject to any disclaimer, the term of this patent is extended or adjusted under 35 U.S.C. 154(b) by 325 days.

(21) Appl. No.: 17/082,260

(22) Filed: Oct. 28, 2020

(65) Prior Publication Data

US 2021/0135705 A1    May 6, 2021

(30) Foreign Application Priority Data

Oct. 31, 2019 (NL) ...................................... 2024132

(51) Int. Cl.
*H04W 4/33*    (2018.01)
*H04B 1/7163*    (2011.01)
(Continued)

(52) U.S. Cl.
CPC .......... *H04B 1/7163* (2013.01); *A01G 9/143* (2013.01); *A01G 31/042* (2013.01); *G01S 5/02* (2013.01);
(Continued)

(58) Field of Classification Search
CPC ....... H04W 4/02; H04W 4/023; H04W 4/029; H04W 4/021; H04W 64/00
See application file for complete search history.

(56) References Cited

U.S. PATENT DOCUMENTS

| 2006/0213167 | A1  | 9/2006 | Koselka et al. |
| 2007/0159991 | A1* | 7/2007 | Noonan .................... H04K 3/42 370/310 |

(Continued)

FOREIGN PATENT DOCUMENTS

| CN | 109451435 A | 3/2019 |
| CN | 109491395 A | 3/2019 |

(Continued)

OTHER PUBLICATIONS

European Search Report and Written Opinion for the European Patent Application No. NL2024132, dated Jun. 15, 2020, 9 pages.

*Primary Examiner* — Benyam Haile
(74) *Attorney, Agent, or Firm* — KDW Firm PLLC

(57) ABSTRACT

A method using ultra wide band (UWB) communication for determining a location of an object inside a plant growing environment, wherein the object is provided with an UWB transmitter; the plant growing environment is provided with multiple UWB receivers; and the receivers are connected to a processing unit. The method includes: broadcasting a message from the object over UWB using the transmitter; receiving the message at at least some of the receivers; and determining a location estimate for the object through lateration and/or angulation, by the processing unit. A UWB communication system for performing the method and a plant growing environment comprising such a system.

17 Claims, 8 Drawing Sheets

(51) Int. Cl.
  *A01G 9/14*    (2006.01)
  *A01G 31/04*   (2006.01)
  *G01S 5/02*    (2010.01)
  *H04W 64/00*   (2009.01)
  *G05D 1/02*    (2020.01)
  *G06F 17/00*   (2019.01)

(52) U.S. Cl.
  CPC .............. *H04W 64/00* (2013.01); *A01G 9/14* (2013.01); *G05D 1/021* (2013.01); *G06F 17/00* (2013.01)

(56) References Cited

U.S. PATENT DOCUMENTS

2013/0124239 A1\* 5/2013 Rosa .................... A01D 41/127
                                                  705/7.11
2016/0235013 A1\* 8/2016 Pohjanvouri .......... H05B 45/20

FOREIGN PATENT DOCUMENTS

EP          2866528 A1    4/2015
WO       2013074536 A1    5/2013

\* cited by examiner

METHOD USING ULTRA WIDE BAND (UWB) AND UWB SYSTEM FOR DETERMINING A LOCATION OF AN OBJECT INSIDE A PLANT GROWING ENVIRONMENT

CROSS-REFERENCE TO RELATED APPLICATIONS

This application claims priority to Netherlands patent application serial number 2024132, filed Oct. 31, 2019, the entirety of which application is incorporated by reference herein.

FIELD OF THE INVENTION

The invention relates to a method using ultra wide band (UWB) communication for determining a location of an object inside a plant growing environment, such as a greenhouse or an indoor growing facility.

BACKGROUND OF THE INVENTION

In the prior art, no location determination in growing environments takes place. The growing environments can however be rather large. It would therefore be advantageous if the location of certain objects were known.

Several known methods of location determination in general exist, but have so far not been suitable for use in plant growing environments because of the difficulties associated therewith. GPS for instance, is not sufficiently accurate for indoor use, and in some occasions is not considered at all, due to its inadequate signal strength indoors. The accuracy of location determination techniques further suffers from the ubiquity of steel and glass in plant growing environments. Therefore, there is a significant hurdle in implementing a location determination system in these environments.

SUMMARY OF THE INVENTION

The applicant has however found that location determination can be achieved with the method of the preamble, wherein the object is provided with an UWB transmitter; the plant growing environment is provided with multiple UWB receivers; and the receivers are connected to a processing unit, the method comprising: a) broadcasting a message from the object over UWB using the transmitter; b) receiving the message at at least some of the receivers; and c) determining a location estimate for the object through lateration and/or angulation, by the processing unit.

It has been found that UWB technology can be used to overcome the obstacles presented by plant growing environments of the indoor type. Therefore, where this application refers to a plant growing environment, an indoor location may be referred to.

The transmitter may be provided in a physical device, often named a tag, which is attached to the object. The receivers may be provided in physical devices called anchors, which may be placed at fixed positions in the plant growing environment.

The message sent from the object may comprise any one or more of the following: a timestamp, information with which the transmitter or the tag to which it belongs may be identified, and information identifying the object for which the transmitter is provided.

The timestamp may be used for trilateration and/or triangulation. Although trilateration and triangulation are referred to specifically, the method is not limited to the use of exactly three measurements. More than three or less than three measurements may be used. Consequently, the location determination may take place through angulateration, specifically through triangulateration.

The location estimate for the object may be used in several advantageous ways, depending on what type of object is provided with the UWB transmitter.

In any case, it may be advantageous if the processing unit associates the object with a plant or group of plants, by: comparing the location estimate with predetermined locations of plants or groups of plants; and associating the object with the plant or group of plants of which the predetermined location is closest to the location estimate.

By associating the object with a plant or group of plants, a relation between the two may be recorded. "Associating" may therefore herein mean concluding that the object interacts with that specific plant or plants of that specific group of plants. The association may be stored in a database provided therefore, e.g. as an entry therein. The association may further be stored together with information on the object and/or the plant or group of plants and/or the time at which the association was made.

The association may be used as information on what operations are performed on each plant or group of plant. The operations performed on the plant or group of plants are an important part of the plant growing process. Logging which operations are done on a plant or group of plants, for how long and at what point in time, facilitates significant improvements in supply chain tracking, work logging and/or growth process research.

When the object is a worker or robot, the method according to the invention may be used for registering work performed in a plant growing environment, comprising:
  recording the time at which an object is associated with a plant or group of plants; and
  recording the time at which an object is no longer associated with the same plant or group of plants.

The recorded information may then be used to determine e.g. how much to pay the worker, if a worker has put in enough hours over a certain period, etc.

An object may be no longer associated with the same plant or group of plants if it is associated with a new plant or group of plants, or if the object moves away from said plant or group of plants. It may therefore be useful to no longer associate the object with the plant or group of plants if a mutual distance exceeds a predetermined threshold, and/or if the location estimate for the object corresponds to a predetermined location other than that of the plant or group of plants, such as a (main) pathway in the plant growing environment. Consequently, no longer associating the object with a plant or group of plants may be based on a comparison of the location estimate to a predetermined location of e.g. the main pathway.

In one embodiment of the method according to the invention, groups of plants are distributed in rows of plants, and the object is associated with a row of plants which is closest to the location estimate.

In this embodiment the layout of the plant growing environment, i.e. the organization of plants in rows, is used to simplify association of the object with the group of plants.

Associating the object with the row of plants which is closest to the location estimate may be achieved by defining a rectangular area around each row, so that each rectangular area contains exactly one row along a centreline of each rectangle and no rectangular areas overlap. The row closest to the to the location estimate may than be determined to be the row in the same rectangle as the location estimate. To determine in which rectangle the location estimate is, coordinates of the edges of the rectangles may be compared to the coordinates of the location estimate.

Particularly, the object may be associated with two rows of plants separated by a sub-pathway, the two rows of plants being the two rows closest to the location estimate. This may be achieved by defining rectangles having edges along each row of plants, wherein the rectangles have ends corresponding to ends of the rows of plants, and by determining in which rectangle the location estimate is by comparing coordinates of the rectangle's edges with the coordinates of the location estimate.

In a growing environment comprising a main pathway and sub-pathways branching off from the main pathway, wherein the rows of plants lie along the sub-pathways, associating the object with a row plants by determining at which row the object enters a sub-pathway from the main pathway. This could be achieved by comparing the coordinates of the location estimate to predetermined coordinates of the main pathway to conclude the object is in the main pathway at a first point in time if the coordinates match, and then concluding the object is in a sub-pathway by comparing the coordinates of the location estimate with predefined coordinates of the sub-pathway if the coordinates match. The object can then be associated with the row or rows of plants running along the sub-pathway.

Further, if the coordinates of the location estimate with predetermined coordinates of a sub-pathway at a first moment in time, and the coordinates of the location estimate match with the predetermined coordinates of the main pathway at a second, later point in time, the object may no longer be associated with the row(s) of plants along the respective sub pathway.

This has the advantage that objects may be reliably associated with a row of plants along a sub-pathway by providing only the main pathway and the end zone of sub-pathways near the main pathway with sufficient signal coverage. Signal coverage at the other end zone of the sub-pathways, which is located further away from the main pathway, is not necessary. Consequently, the growing environment could be provided with a relatively small amount of anchors concentrated around the main pathway. Using less anchors may reduce the total cost of the system.

An association of the object with a single plant within the row of plants may be achieved by dividing the closest row of plants into several segments, each of which corresponds to a length of the row taken up by a single plant and is associated with a single plant; and associating the object with a segment in the row which is closest to the location estimate.

As on average plants take up a similar amount of space along the length of the row of plants, the position of each plant along the row may be estimated by dividing the row of plants into segments which correspond to a length of the row taken up by a single plant. Consequently, each segment corresponds to a single plant, so that associating the object with a segment equals associating the object with a single plant. As a result, information on the row and on the space taken up by the plant along the length of the row are required for associating the object with a single plant, instead of the location of every plant itself. The space taken up by a plant along the length of the row may correspond to the average width of a plant including the interspace between consecutive plants in the same row.

Alternatively or additionally, groups of plants may be distributed in sections of e.g. rectangular shape in plan view, wherein the object is associated with the section which is closest to the location estimate.

Such sections may be used to treat plants in groups which are easy to identify. Furthermore, the sections, e.g. rectangular in shape, may very well be handled or treated together based on their location. Treating the plants in sections may allow a grower to distinguish between plants that e.g. get a lot of sun versus plants that get relatively little sun, without having to distinguish on a per plant basis. Further, grouping plants into sections may offer efficiency gains when treating the plants, for instance by subjecting all plants within a section to a same or similar operation such as harvesting, removing leaves, applying pesticides, etc.

Alternatively, each group of plants may be placed on a platform, and the object is associated with the platform which is closest to the location estimate.

By associating the object with a platform, the object can indirectly be associated with the plants on the platform. Associating the object with a group of plants via a platform may offer the additional advantage of not having to know the location of each individual plant. This is especially useful for plants on a platform, which are often relatively small in size but relatively large in number.

Since the platform may be movable, the location of the platform may be determined similar to the location of the object, i.e. via the above-described UWB method.

Moreover, the plants and/or rows of plants and/or sections of plants may have predetermined locations, possibly obtained by an UWB method as described above.

In that respect, at least some of the predetermined locations may be obtained via lateration and/or triangulation over UWB. In particular, the above described method may be used to obtain the predetermined locations, especially with the characteristics explained herein in any arbitrary combination.

As a result, it becomes possible to associate two movable objects with each other based on a current location estimate for each of the objects. This is especially useful when associating the location of e.g. human operators with plants, human operators with tools, tools with plants, etc.

In case the object is an agent, such as a human operator or robot, the method may further comprise a step e) of determining, by the processing unit, an operation performed on the plant or group of plants by the agent.

As explained above, it is of importance for reasons of supply chain tracking and work logging to know which operations are being performed. In the case of supply chain tracking, the knowledge of which operations were performed, possibly including at what time and for how long, may offer insight into how a growth process may be improved. Further, the information allows a plant grower to prove certain operations have been performed on the plants. In the case of work logging, knowing which operations are performed may aid in e.g. determining the pay and/or schedule of human operators.

The method may further include registering when and/or for how long the operation is being performed.

To determine the operation performed, step e) may comprise: retrieving a preplanned operation to be performed from a database; and determining that said retrieved, preplanned operation on the plant or group of plants is being performed.

Retrieving the operation from a database with preplanned operations may provide a reliable way of determining which operation is carried out, as all or almost all operations on plants may be preplanned and registered in the database.

Depending on how operations are planned, the preplanned operation may be an operation preplanned to be performed by the agent. In that case, it may be determined that the operation preplanned for the agent to whom the UWB transmitter is provided is performed on the plant associated with the agent via the location determination.

Alternatively, the preplanned operation may be a preplanned operation to be performed on the plant or group of plants. In that case, it may be determined that the operation preplanned to be performed on the plant or group of plants associated with the UWB transmitter of the agent is performed by the agent.

These alternatives are useful when the method according to the invention is implemented on existing systems including work scheduling for agents, or when a new scheduling system is used.

Further, step e) of the method may comprise: comparing the location estimate of the agent to the location of an operation specific tool; and determining that the operation specific to the tool is being performed if the locations of the agent and the tool correspond within a predetermined margin.

Such a method may allow determination of the operation performed without use of a database with preplanned operations. Such a database may not always be available, complete and/or accurate, so that determining the operation via the location of an operation specific tool may prove helpful.

The location of the tool may be determined in any suitable way; it is however preferred the location is determined using the above-described UWB method, with any arbitrary combination of characteristics described hereabove.

It is noted that the predetermined margin may be a margin in location and/or a margin in time. For example, it may be determined that an operation specific to the tool is being performed when the agent's location is within a predetermined distance from the tool's location. It is also possible to determine that an operation specific to the tool is being performed if the locations of the tool and the agent correspond sufficiently within a predetermined timeframe around the time of determining the location of the agent.

As an example, it may be determined an operation specific to a tool is performed on a certain plant or group of plants if the location of the agent is associated with the certain plant or group of plants at a first point in time and if the location of the agent is within a predetermined distance from an operation specific tool at a second point in time, wherein the difference in time between the first and second points in time is smaller than a predetermined threshold.

In particular, the operation specific tool may be a transport trolley or cart for collecting harvest, wherein the operation specific to the tool is harvesting. In this case it may be concluded that an agent is harvesting if its location is associated with a plant or group of plants at the first point in time, and with the transport trolley or cart at the second point in time. As the agent may move between the plant or group of plants and the transport trolley or cart several times, the second point in time may lie before or after the first point in time.

It may be especially advantageous if the transport trolley or cart is equipped with a weighing unit for weighing the amount of harvest transported by the transport trolley or cart, wherein a weight measured by the weighing unit is associated with the plant or group of plants associated with the harvesting operation. For this reason, the weighing unit may be connected with the processing unit for providing the processing unit with a signal indicated the weighing result.

Associating the amount of harvest with a plant or group of plants has the advantage that further analysis is possible on a relation between certain operations performed and the amount of harvest a plant or group of plants produces. Additionally or alternatively, the amount of harvest may be used to determine if a human operator has met his or her quota.

Alternatively, or additionally, the location estimate may be used advantageously for indicating the presence of a condition.

For example, if the object is an agent, such as a human operator or robot, the method may comprise step f) of receiving an input, by the processing unit, indicating a condition by the agent, and associating, by the processing unit, the condition with the location estimate of the agent.

Such a method may be particularly advantageous when the agent is scouting, i.e. checking the plant growing environment for specific conditions that require attention. The association between the condition and the location may be registered and/or saved, so that it may be retrieved later on. If used, planning software may then schedule an operation to be performed to deal with the registered condition.

The input may be provided to the processing unit by the agent, i.e. via an interface such as a user interface or a communications channel.

The condition may for instance include environment conditions, such as temperature, moisture levels, etc., or a condition of the plant growing environment requiring maintenance, such as a broken window, damaged screening, etc., a plant condition or any other condition relevant for growing plants.

If the condition is a plant condition, such as an illness or plague, or plant characteristic, it may be advantageous if step f) comprises associating, by the processing unit, the condition or the characteristic with the plant or group of plants associated with the location estimate.

In this way, the agent may be able to register conditions for a plant or group of plants relatively quickly, since no input indicating to which plant or group of plants the conditions applies is necessary. This may also reduce the amount of errors made when manually entering to which plant or group of plants the condition pertains.

The plant characteristic may be any noticeable and relevant feature of the plant or group of plants, such as colour, stem thickness, amount or presence of fruits, ripeness of fruits, etc.

In the method according to the invention, the object may be one of the following: a human operator; a transport trolley or cart; a work platform; a bench or table; a robot, such as a drone; a sensor; an actuator such as a fan; an imaging device, such as a camera, possibly carried by a human operator or robot; a box or crate; and a plant.

If the object is an imaging device, its location estimate, possibly in combination with the location estimates of other objects, may be used to determine which objects are seen by the imaging device.

In an embodiment of the method according to the invention, the object is further provided with a UWB receiver; and the plant growing environment is further provided with at least one UWB transmitter connected to the processing unit, the method further comprising a step g) of sending a message to the UWB receiver via the at least one transmitter of the plant growing environment.

The additional receiver and sender allow two-way communication between the processing unit and the object.

Two-way communication may be used in a variety of ways. As an example, if the object is a human operator, the message may comprise instructions for the human operator. In particular, the message may comprise information on whether the human operator works fast enough, for instance based on a harvested amount and a pre-set target, or information on whether the human operator can take a break from working. The object may further be provided with one or more lights, possibly of different colour, the status of which is changed on the basis of the message for relaying the message's contents to the user. As a practical example, a light may shine green if the human operator has harvested enough to achieve his personal target, or a light may shine yellow if it is time for the human operator to take a break.

Alternatively, if the object is a robot, the two-way communication may be used to instruct the robot to perform certain tasks. For that reason, the UWB receiver of the object may be connected to the robot for communication therewith.

It is foreseen that the processing unit is connected to an existing work registration system, so as to receive instructions from the work registration system. Alternatively, the processing unit may replace an existing work registration system.

The invention also relates to an ultra wide band (UWB) communication system for determining a location of an object inside a plant growing environment, such as a greenhouse or an indoor growing facility, the system comprising: a tag provided with an UWB transmitter, which is configured to be attached to or carried by the object; multiple anchors, provided with UWB receivers, which are configured to be installed in the plant growing environment; and a processing unit, to which the anchors are connected, wherein: the tag is configured to broadcast a message using the UWB transmitter; the anchors are configured to receive messages sent by the UWB transmitter via their respective UWB receivers; and the processing unit is configured to determine a location estimate for the object through lateration and/or triangulation.

The system may be used for performing the above-described method, and therefore present the above-described characteristics in any arbitrary combination, and offer the advantages associated therewith.

And finally, the invention relates to a plant growing environment, such as a greenhouse or an indoor growing facility, which comprises a system as described above.

In such a plant growing environment, the anchors may advantageously be installed at various spaced apart locations. In that way the entire plant growing environment may be covered by the UWB communication system. By suitably positioning the anchors interference due to e.g. structural elements of the plant growing environment may be minimized With a view to maximizing coverage and minimizing interference it may also be beneficial for the anchors to be installed at different heights.

When the plant growing environment is a greenhouse including a structural frame and transparent covering, the anchors may be installed on the structural frame. In this way the plant growing environment is hardly affected by the installation of the system.

When the processing unit of the system is arranged at a remote location it may be advantageous for the anchors to be connected to the processing unit via a wireless connection. In this way no additional wiring is required for the installation of the system.

BRIEF DESCRIPTION OF THE DRAWINGS

The invention will be further elucidated with reference to the attached schematic figures, in which.

Throughout the figures, like elements are referred to by like reference numerals. Like elements of different embodiments are referred to by reference numerals increased by one hundred (100).

DETAILED DESCRIPTION

Figure 1:
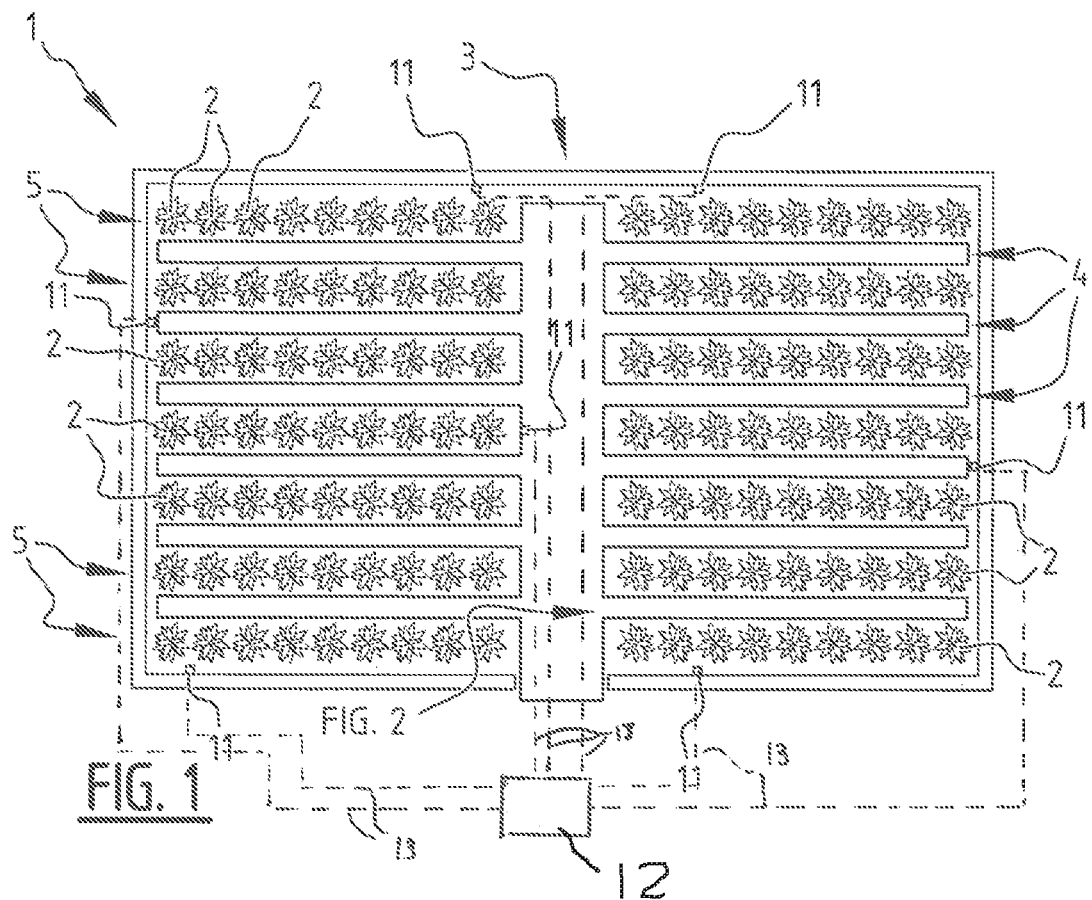
FIG. 1 shows a plan view of a greenhouse including an UWB system according to the invention.
Figure 2:
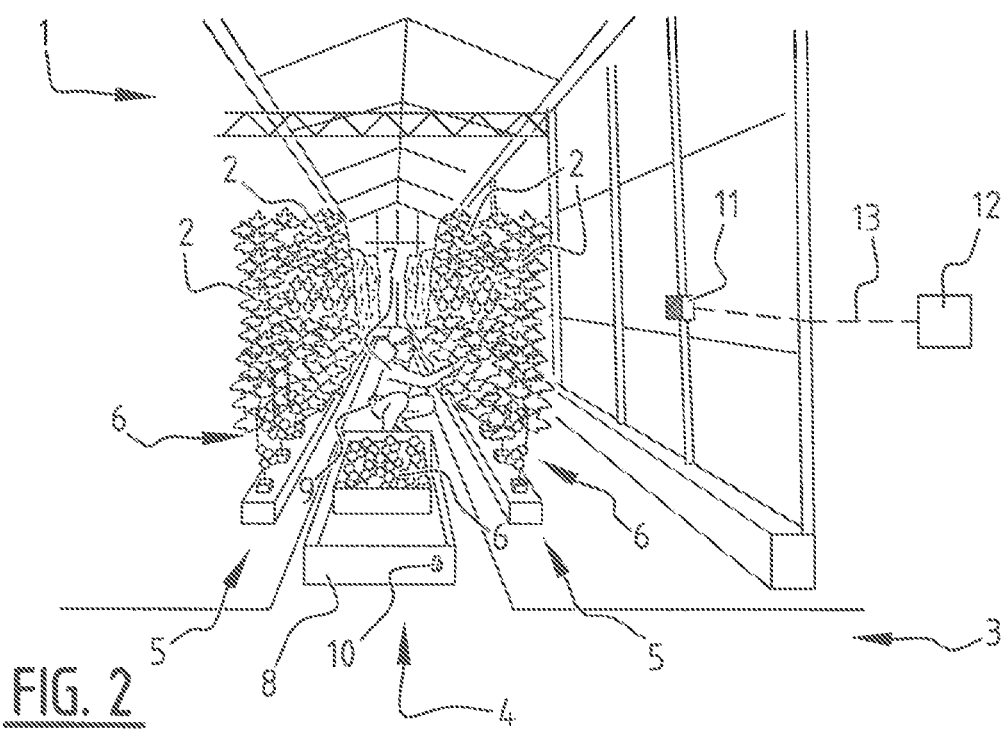
FIG. 2 shows a perspective view of a human operator harvesting in the greenhouse of FIG. 1.

FIG. 1 shows a greenhouse 1 with a number of plants 2 therein. The greenhouse 1 comprises a main pathway 3, which divides the greenhouse 1 into two halves. Branching off from the main pathway 3 are several sub-pathways 4. In the example shown in FIGS. 1 and 2, the plants 2 are placed in rows of plants 5 between the sub-pathways 4. As can be seen in FIG. 2, the plants 2 produce crops 6, e.g. tomatoes. By means of example, crops 6 are harvested by a human operator 7. The human operator 7 collects harvested crops 6 in a transport trolley 8.

The greenhouse 1 is provided with an UWB system for determining a location of objects inside of the greenhouse 1. Accordingly, the human operator 7 is provided with a first tag 9, and the transport trolley 8 is provided with a second tag 10. The tags 9, 10 each comprise an UWB transmitter. The greenhouse 1 comprises multiple anchors 11 mounted at several locations throughout the greenhouse 1. The anchors 11 are provided with UWB receivers. As shown in FIG. 1, the anchors 11 may be located both along the walls of the greenhouse 1 and at central locations, e.g. in the main pathway 3. The anchors 11 may also be located at different heights in the greenhouse 1. The position of each anchor 11 may be selected so as to minimize interference due to e.g. structural elements of the greenhouse 1 and to maximize coverage of the interior of the greenhouse 1. For reasons of simplicity only one anchor 11 is shown in FIG. 2, the anchor 11 being installed on a sidewall at some distance from the ground.

The system further includes a processing unit 12. In the illustrated embodiment the anchors 11 are connected to the processing unit 12 via wired connections 13. Alternatively, wireless connections could be used, in particular if the processing unit 12 would be arranged at a remote location.

The operation of the system shown in FIGS. 1 and 2 will be further explained with reference to FIGS. 3-6.

Figure 3:
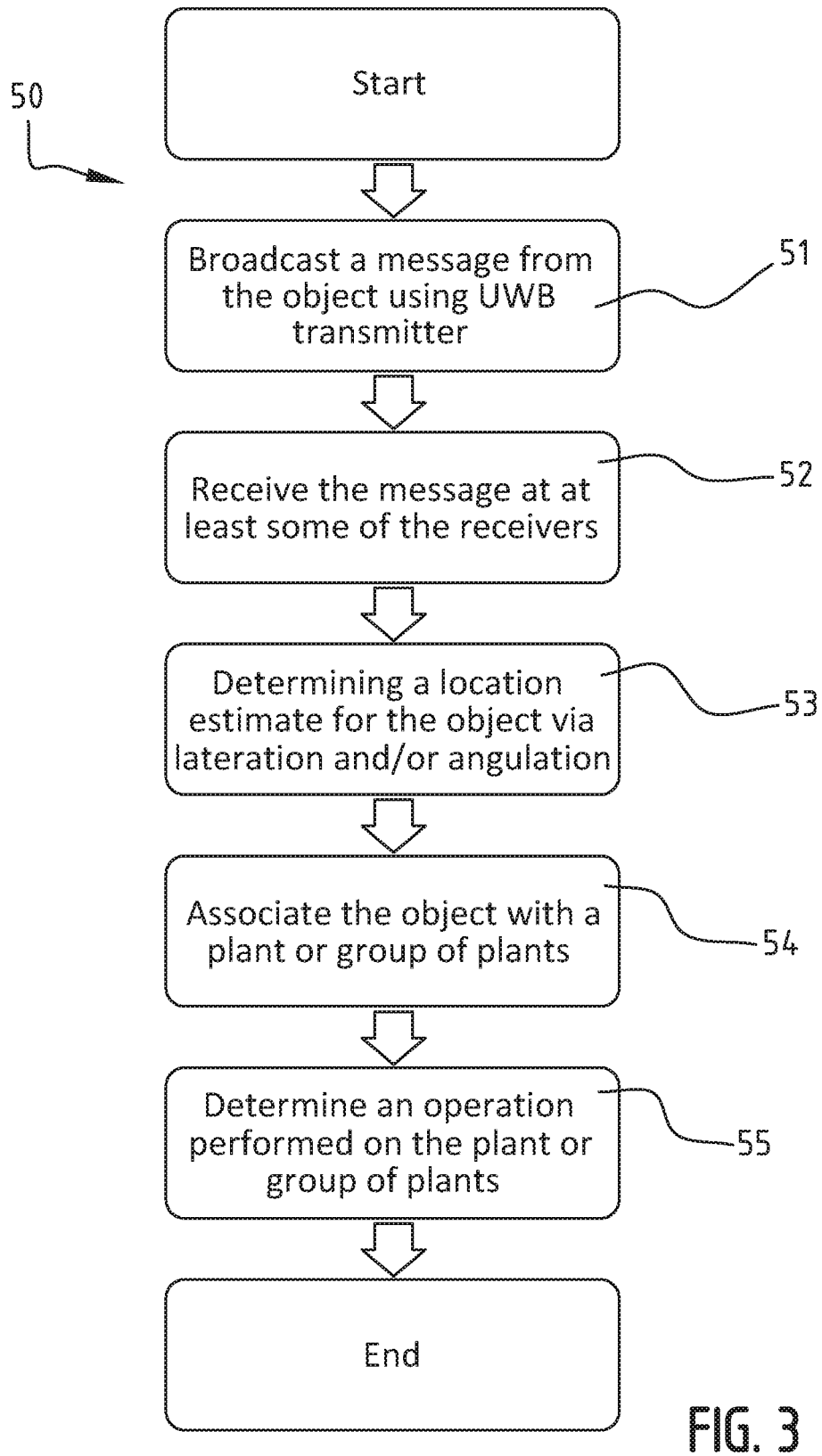
FIG. 3 schematically shows steps performed by the UWB system of FIG. 1 in an exemplary embodiment of the method according to the invention.

In FIG. 3 an exemplary embodiment of a method 50 according to the invention is described. The method 50 is performed using an UWB system as described with reference to FIGS. 1 and 2. The human operator 7 and the transport trolley 8 are provided with tags 9, 10 which include UWB transmitters. In a first step 51 of the method 50, a message is broadcast from the object, such as the human operator 7 or the transport trolley 8, using the UWB transmitter in the tags 9, 10 respectively. As stated before, the greenhouse 1 is provided with anchors 11 which include UWB receivers. The message sent by the UWB transmitter of the object 7, 8 (in the first step 51) is received in a second step 52 by the UWB receivers of at least some of the anchors 11, which are connected to processor 12.

Figure 7:
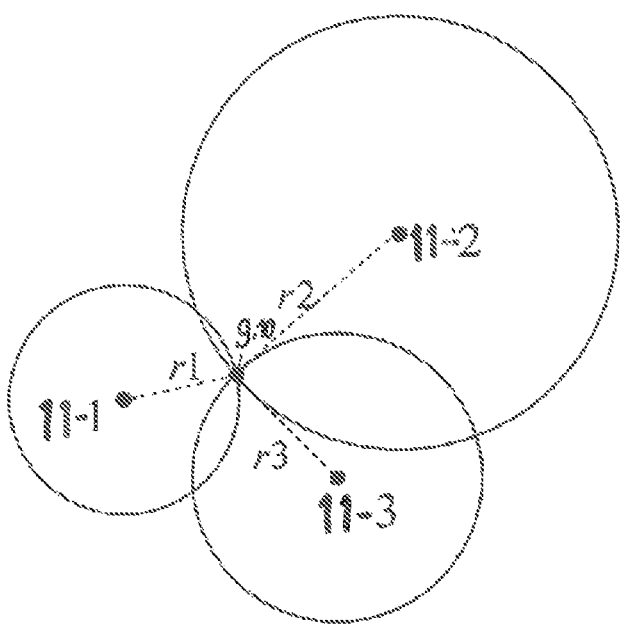
FIG. 7 schematically shows how a location of an object is estimated through lateration.

The processor 12 then, in a third step 53, determines a location estimate for the object 7, 8 through lateration and/or angulation. As illustrated in FIG. 7, the processor 12 may determine the signal strength of a message received at each of three anchors 11-1, 11-2 and 11-3, respectively, and from these signals strengths the processor 12 may determine the distances r1, r2, r3 from the tag 9 or 10 to these anchors. Together, these three distances r1, r2, r3 define an estimated location for the tag 9, 10.

In this exemplary method 50 specifically, the determination of the location estimate (third step 53) is followed by a fourth step 54 performed by the processor 12 of associating the object 7, 8 with a plant 2 or group of plants 2. Even more specifically, a fifth step 55 follows of determining, by the processor 12, an operation performed on the plant 2 or group of plants 2.

FIGS. 4A-4D show several methods 154, 254, 354, 454 of associating the object 7, 8 with a plant 2 or group of plants 2.

Figure 4A:
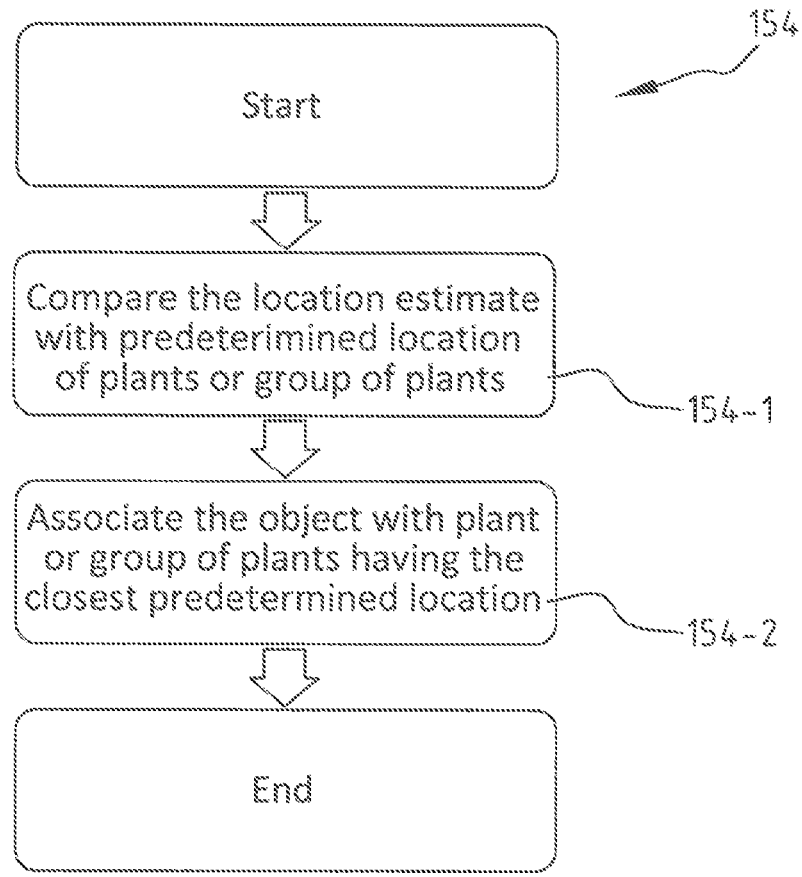
FIGS. 4A-4D schematically show several exemplary methods to associate an object with a plant or group of plants as required by the exemplary embodiment of FIG. 3.

One method 154 shown in FIG. 4A comprises a first step 154-1 of comparing the location estimate with predetermined locations of plants 2 or groups of plants 2, followed by a second step 154-2 of associating the object 7, 8 with the plant 2 or group of plants 2 of which the predetermined location is closest to the location estimate. In particular, when the object is a human operator 7, it may be determined the human operator 7 is working on a specific plant 2 or group of plants 2 which is closest to the human operator 7.

Figure 4B:
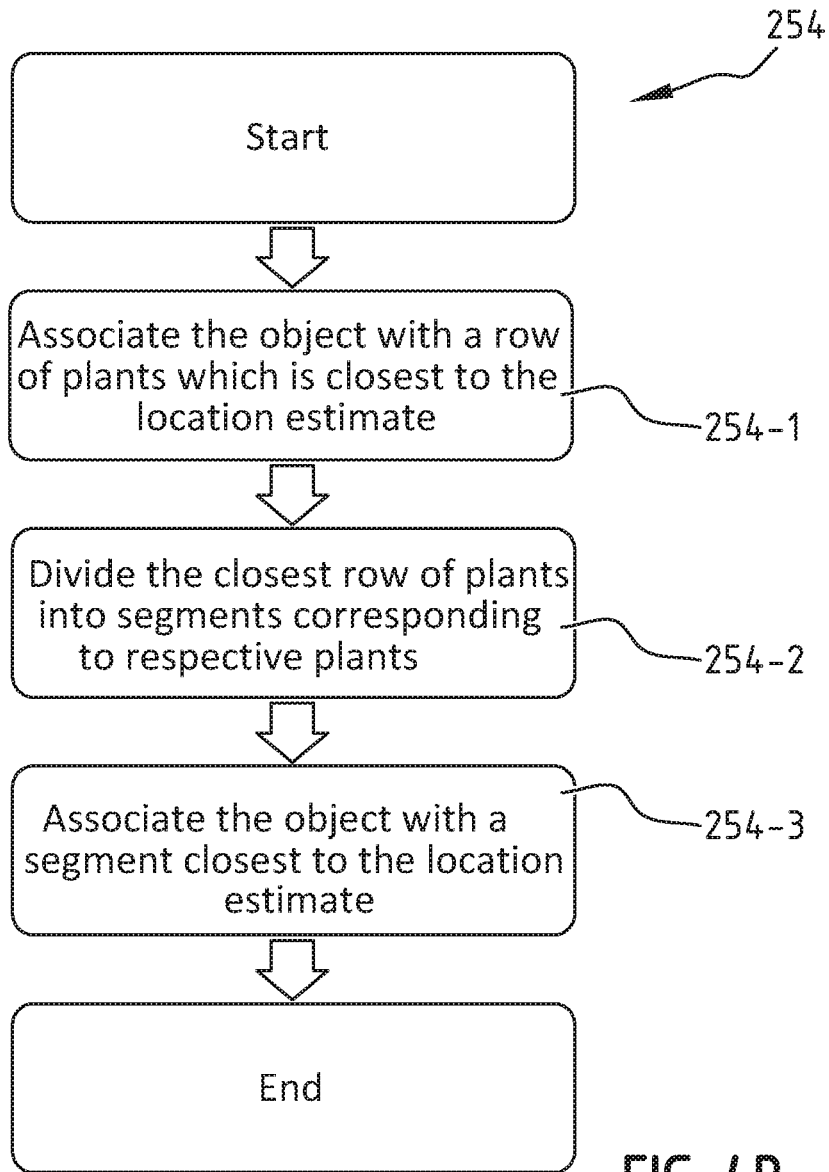

Another method 254 of associating the object 7, 8 with a plant 2 or group of plants 2, is shown in FIG. 4B. The method 254 is applied to a greenhouse 1 wherein plants are distributed, in other words positioned, in rows 5. As a first step 254-1 the object 7, 8 is associated with a row 5 of plants 2 by selecting the row 5 closest to the location estimate for the object 7, 8. In a second step 254-2, the selected row 5 is divided in several segments, each of which corresponds to a length of the row 5 taken up by a single plant 2. Each segment is associated with a single plant 2. To associate the object 7, 8 with a single plant 2, the object is subsequently associated with a segment in the selected row 5 which is closest to the location estimate of the object 7, 8 in a third step 254-3.

Figure 4C:
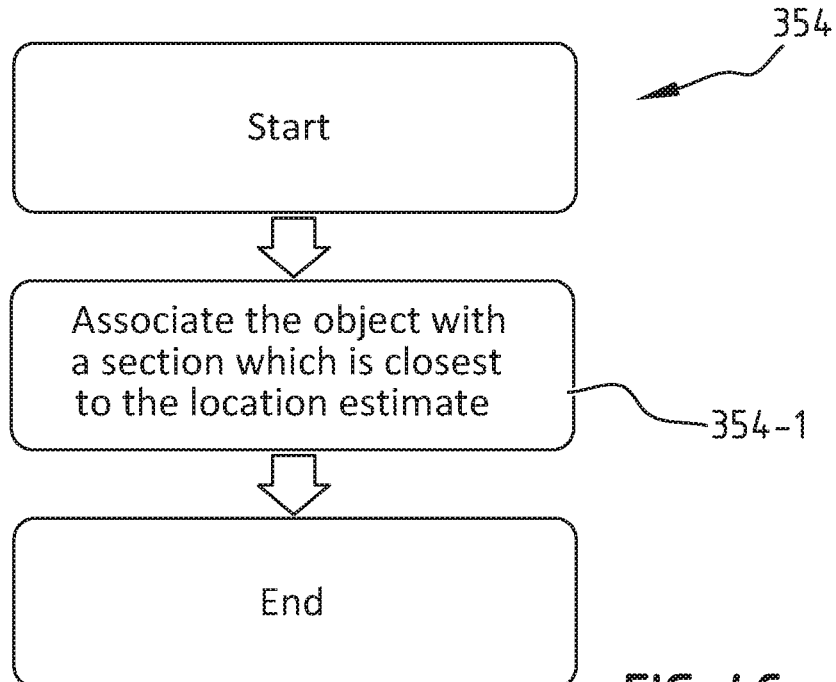

Alternatively, and as illustrated in FIG. 4C by another method 354, it is possible to distribute plants 2 into sections, and to associate the object 7, 8 with the section which is closest to the location estimate in a first step 354-1 of the method 354. This is particularly advantageous when plants 2 are distributed in sections which are rectangular in plane view.

Figure 4D:
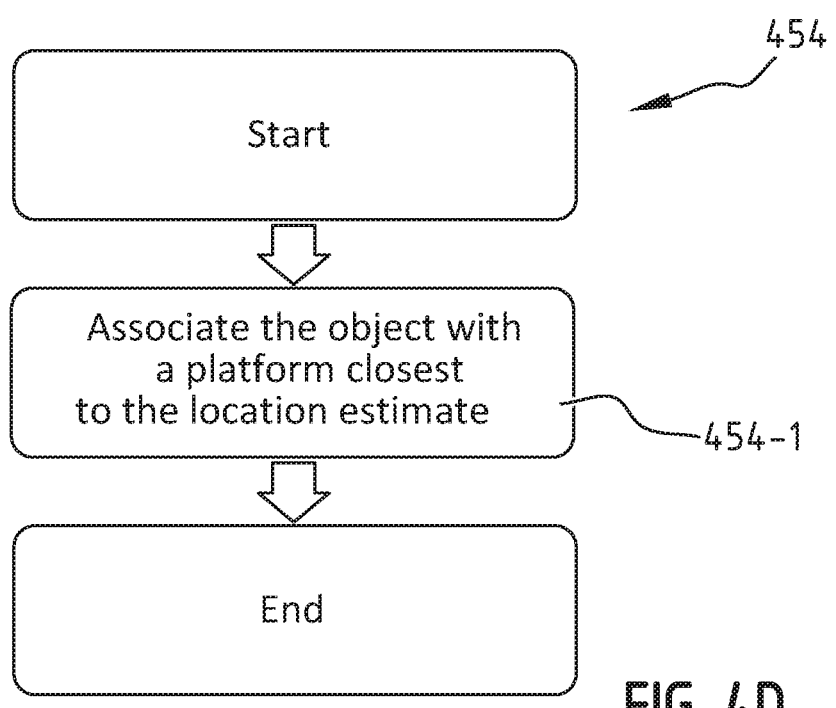

When plants 2 are placed on a platform, such as a movable platform, the object 7, 8 may be associated with a group of plants 2 on a platform according to another method 454 shown in FIG. 4D, comprising a first step 454-1 of associating the object 7, 8 with a platform which is closest to the location estimate of the object 7, 8.

The methods 154, 254, 354, 454 of FIGS. 4A-4D may be used to derive which human operator 7 works on which plant 2 or group of plants 2 for how long and at what moment in time. Specifically, when the object is a human operator 7, it may be concluded that the human operator 7 works on a plant 2 or group of plants 2 when the human operator 7 is associated with the plant 2 or group of plants 2. Therefore, the methods outlined above may be part of a labour-tracking system which determines wages to pay a human operator 7 based on the amount of work done. When the object is e.g. a robot, labour tracking may not be necessary for calculating wages, but may nevertheless be useful for supply chain logging or growth process research.

Figure 5A:
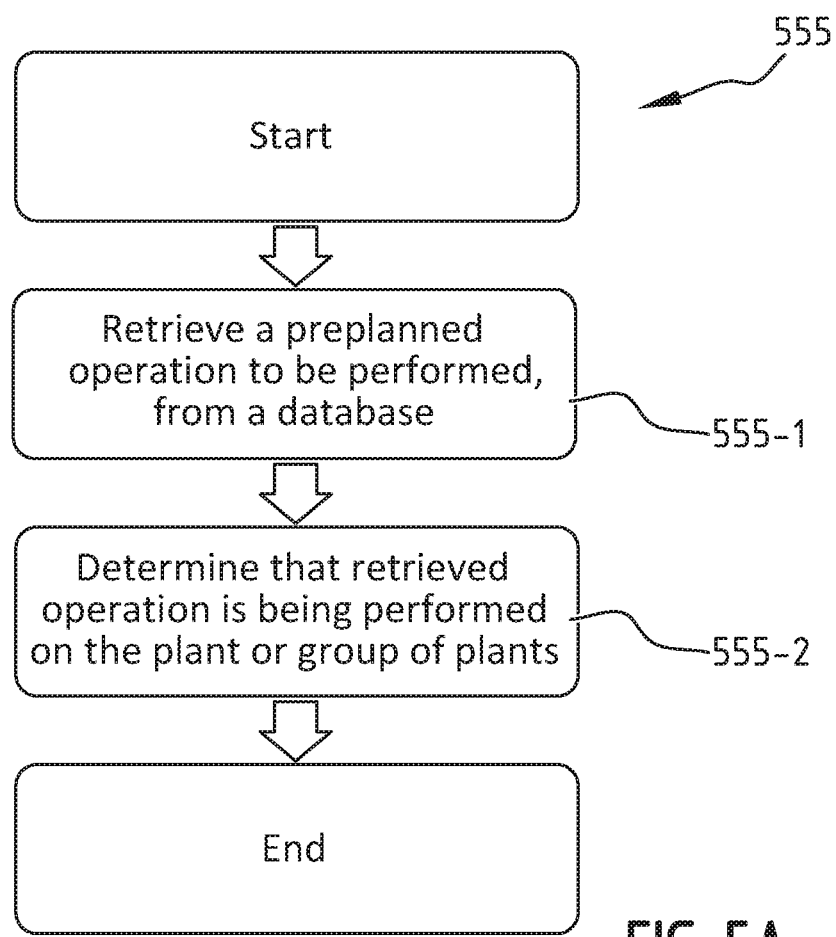
FIGS. 5A-5B schematically show several exemplary methods to determine an operation performed on a plant or group of plants as required by the exemplary embodiment of FIG. 3.
Figure 5B:
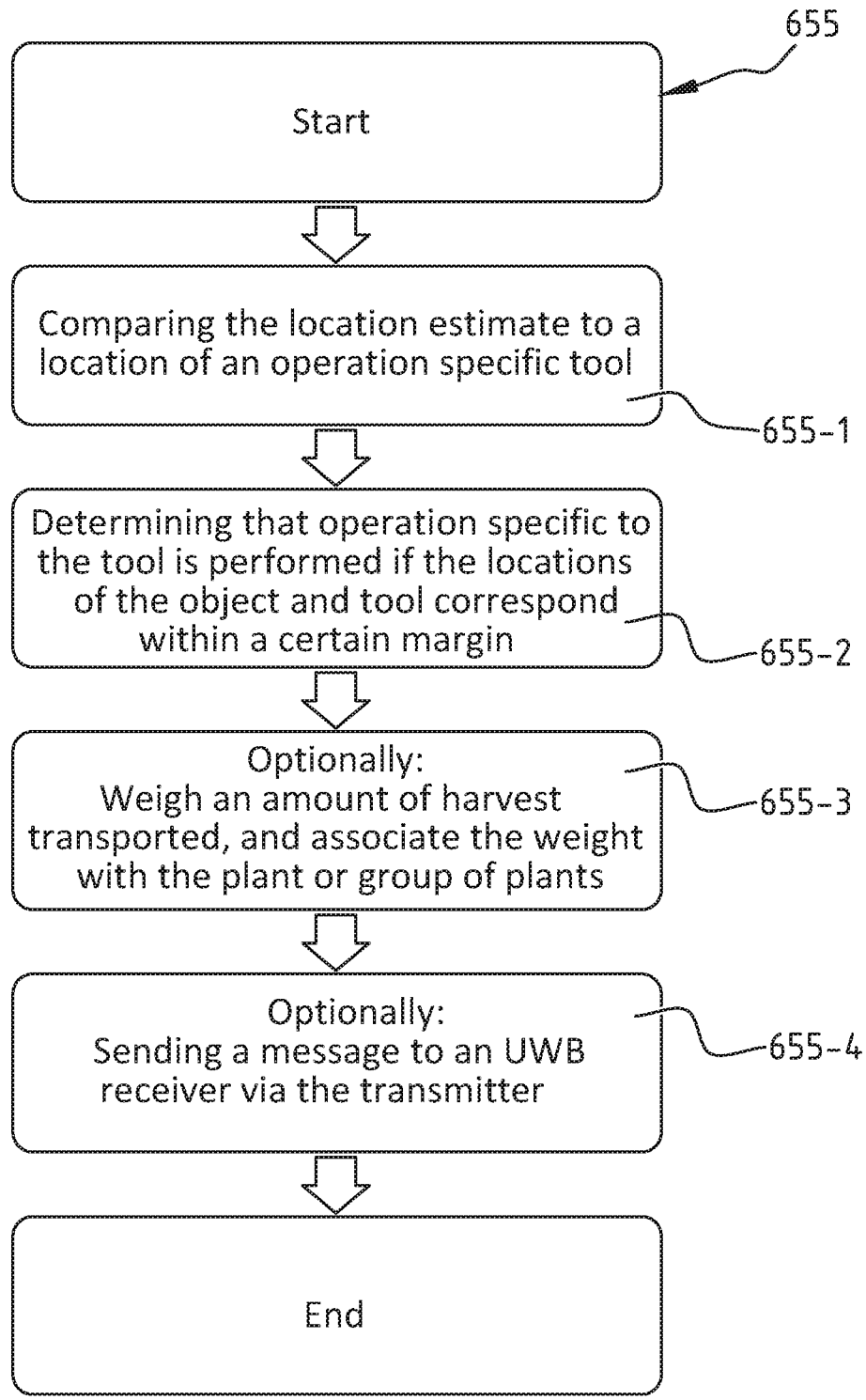

Determining an operation performed on the plant 2 or group of plants 2, as introduced in the fifth step 55 of the method 50 of FIG. 3, can be performed by the methods 555 and 655 shown in FIGS. 5A and 5B. In both methods, the object is an agent, such as a human operator 7 or a robot, which is capable of performing operations on a plant 2 or group of plants 2.

FIG. 5A shows that in a first step 555-1 a preplanned operation, which is to be performed, is retrieved from a database. In a second step 555-2 it may be determined that the preplanned operation is being performed on the plant 2 or group of plants 2. The preplanned operation can be an operation planned to be performed by an agent such as a human operator 7 or robot. In that case the database from which the preplanned operation is retrieved may be referred to as a schedule database. Alternatively, the preplanned operation can be an operation planned to be performed on the plant 2 or group of plants 2.

A further method 655 of determining the operation performed on a plant 2 or group of plants 2 is shown in FIG. 5B. In a first step 655-1 a location estimate for the agent is compared to a location of an operation specific tool. As an example, the operation specific tool is a transport trolley 8 used specifically for the operation of harvesting. In a second step 655-2 it is determined that the operation specific to the tool 7, in this example harvesting as a specific operation of the transport trolley 8, is being performed if the location estimate for the agent and the tool correspond within a predetermined margin. In the example, if the human operator 7 is close to the transport trolley 8 at a first point in time, for instance after spending time close to a plant 2, it is concluded the human operator 7 has been harvesting from the plant 2. The predetermined margin allows a predetermined deviation in space and/or time.

The method further comprises two optional steps 655-3 and 655-4. The first optional step 655-3 can be performed when the transport trolley 7 is equipped with a weighing unit for weighing the amount of harvest transported by the transport trolley 7. Accordingly, a weight measurement by the weighing unit is associated with the plant 2 or group of plants 2 that is associated with the operation of harvesting in the first optional step 655-3. Since the weight measurement indicates an amount of crop 6 harvested from the plant 2 or group of plants 2 by the worker, it may be used for labour tracking and/or growth process research. The second optional step 655-2 may be performed when the object, in the example a human operator 7, is provided with an UWB receiver and the greenhouse 1 with an UWB transmitter connected to the processing unit 12. According to the second optional step 655-2 a message is sent to the UWB receiver of the human operator 7 via the at least one transmitter of the greenhouse 1. In the example, the message comprises information on the amount of crop 6 the human operator 7 has harvested. Particularly, the information comprised in the message may indicate whether or not the human operator 7 has made his or her quota, or has harvested sufficiently for earning a bonus.

Figure 6:
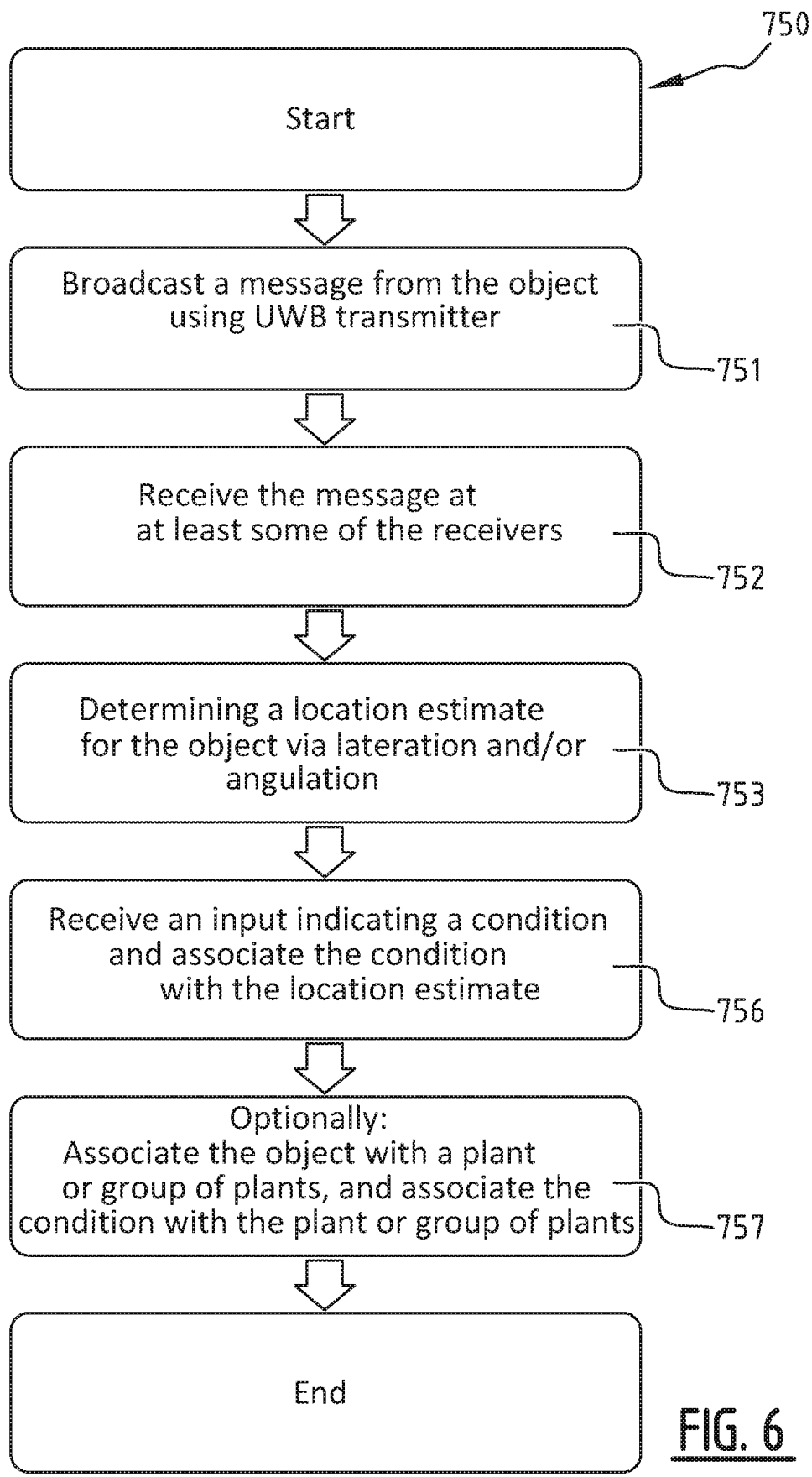
FIG. 6 schematically shows steps performed by the UWB system of FIG. 1 in another exemplary embodiment of the method according to the invention.

Another method 750 using the UWB system for determining a location of an object inside a plant growing environment is presented in FIG. 6. The first three steps 751, 752, 753 correspond to steps 51, 52, 53 previously introduced with reference to FIG. 3 and are thus not further explained herein. A fourth step 756 of the method 750 of FIG. 6 comprises receiving an input indicating a condition, and associating the condition with the location estimate. As an example, the object may be a human operator 7 performing the operation of scouting. Scouting comprises searching the plant growing environment for conditions in need of attention. As an example, the human operator 7 may at a first location notice a broken window in a greenhouse 1. Using a user interface, the human operator 7 may indicate the condition. The condition is then received by the processor 12 in the fourth step 756 of the method 750 of FIG. 6, and associated with the location estimate of the human operator 7. The association between condition and location estimate may be stored. When at a later point in time maintenance work is scheduled, the association may be retrieved.

Optionally, as shown in a fifth step 757 the object is associated with a plant 2 or group of plants 2. The association with a plant 2 or group of plants 2 may be conducted according to the above described methods. In the case of the example, the object is the human operator 7, but a robot could also be used to perform scouting operations. The condition indicated by the input received by the processor is then associated with the plant 2 or group of plants 2. As an example, the condition is a plant condition, such as an illness or plague, or a plant characteristic. For instance, the human operator 7 may indicate the presence of fruits using the user interface. Following the method 750 of FIG. 6, the presence of fruit is associated with a plant 2 or group of plants 2. This information may be stored and used later, for instance in growth process research or work scheduling.

Although the invention has been described hereabove with reference to a number of specific examples and embodiments, the invention is not limited thereto. Instead, the invention also covers the subject matter defined by the claims, which now follow.

The invention claimed is:

1. A method of using ultra wide band (UWB) communication for determining a location of an agent inside a plant growing environment, wherein:
   the agent is provided with an UWB transmitter;
   the plant growing environment is provided with multiple UWB receivers; and
   the receivers are connected to a processing unit,
   the method comprising:
   a) broadcasting a message from the agent over UWB using the transmitter;
   b) receiving the message at least some of the receivers;
   c) determining a location estimate for the agent through lateration and/or angulation, by the processing unit;
   the method further comprising:
   d) associating the agent with a plant or group of plants, by the processing unit, by:
      comparing the location estimate with predetermined locations of plants or groups of plants; and
      associating the agent with the plant or group of plants of which a predetermined location is closest to the location estimate; and
   e) concluding, by the processing unit, which operation is being performed on the plant or group of plants by the agent, by
      retrieving a preplanned operation to be performed from a database; and
      concluding that said retrieved, preplanned operation on the plant or group of plants is being performed based on said association.

2. The method of claim 1, wherein groups of plants are distributed in rows of plants, and the agent is associated with a row of plants which is closest to the location estimate.

3. The method of claim 2, wherein the agent is associated with a single plant within the row of plants by:
   dividing the closest row of plants into several segments, each of which corresponds to a length of the row taken up by a single plant and is associated with a single plant; and
   associating the agent with a segment in the row which is closest to the location estimate.

4. The method of claim 1, wherein groups of plants are distributed in sections, wherein the agent is associated with a section which is closest to the location estimate.

5. The method of claim 1, wherein each group of plants is placed on a platform and the agent is associated with the platform which is closest to the location estimate.

6. The method of claim 1, wherein at least some of the predetermined locations are obtained via lateration and/or triangulation over UWB.

7. The method of claim 1, wherein the preplanned operation is an operation preplanned to be performed by the agent, or wherein the preplanned operation is a preplanned operation to be performed on the plant or group of plants.

8. The method of claim 1, wherein step e) comprises:
   comparing the location estimate of the agent to a location of an operation specific tool; and
   determining that an operation specific to the tool is being performed if the locations of the agent and the tool correspond within a predetermined margin.

9. The method of claim 8, wherein the operation specific tool is a transport trolley or cart for collecting harvest, wherein the operation specific to the tool is harvesting, wherein the transport trolley or cart is equipped with a weighing unit for weighing an amount of harvest transported by the transport trolley or cart, wherein a weight measured by the weighing unit is associated with the plant or group of plants associated with the harvesting operation.

10. The method of claim 1, the method further comprising:
   e) receiving an input, by the processing unit, indicating a condition by the agent, and associating, by the processing unit, the condition with the location estimate of the agent.

11. The method of claim 10, further comprising:
   d) associating the agent with a plant or group of plants, by the processing unit, by:
      comparing the location estimate with predetermined locations of plants or groups of plants; and
      associating the agent with the plant or group of plants of which the predetermined location is closest to the location estimate;
      wherein the condition is a plant condition or plant characteristic and wherein step e) further comprises:
      associating, by the processing unit, the condition or the characteristic with the plant or group of plants associated with the location estimate.

12. The method of claim 1, wherein the agent is one of the following:
   a human operator;
   a robot.

13. The method of claim 1, wherein:
the agent is further provided with a UWB receiver; and
the plant growing environment is further provided with at least one UWB transmitter connected to the processing unit,
the method further comprising:
g) sending a message to the UWB receiver via the at least one UWB transmitter of the plant growing environment.

14. An ultra wide band (UWB) communication system for determining a location of an agent inside a plant growing environment, the system comprising:
a tag provided with an UWB transmitter, which is configured to be attached to or carried by the agent;
multiple anchors, provided with UWB receivers, which are configured to be installed in the plant growing environment; and
a processing unit, to which the anchors are connected, wherein:
the tag is configured to broadcast a message using the UWB transmitter;
the anchors are configured to receive messages sent by the UWB transmitter via their respective UWB receivers; and
the processing unit is configured to determine a location estimate for the agent through lateration and/or triangulation,
wherein the system is configured to perform the method according to claim 1.

15. A plant growing environment, comprising a system according to claim 14, wherein:
the anchors are installed at various spaced apart locations and/or the anchors are installed at different heights.

16. The plant growing environment of claim 15, wherein the plant growing environment is a greenhouse including a structural frame and transparent covering, and wherein the anchors are installed on the structural frame.

17. The plant growing environment of claim 15, wherein the processing unit is arranged at a remote location and wherein the anchors are connected to the processing unit via a wireless connection.

* * * * *